Nov. 26, 1935.  G. WHITE  2,022,530
TREATMENT OF ABRASIVE TOOLS
Filed Jan. 19, 1935
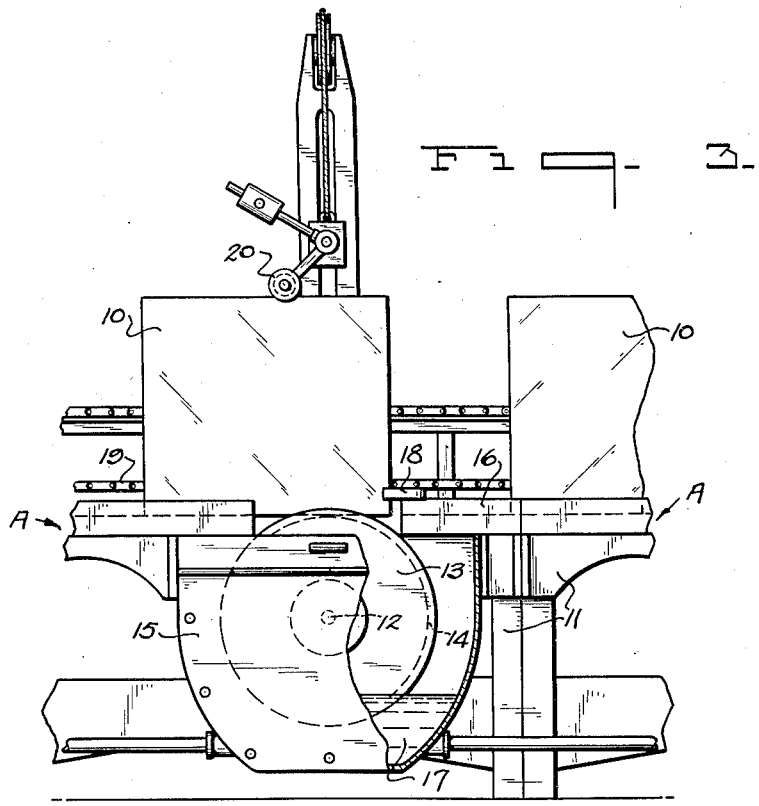
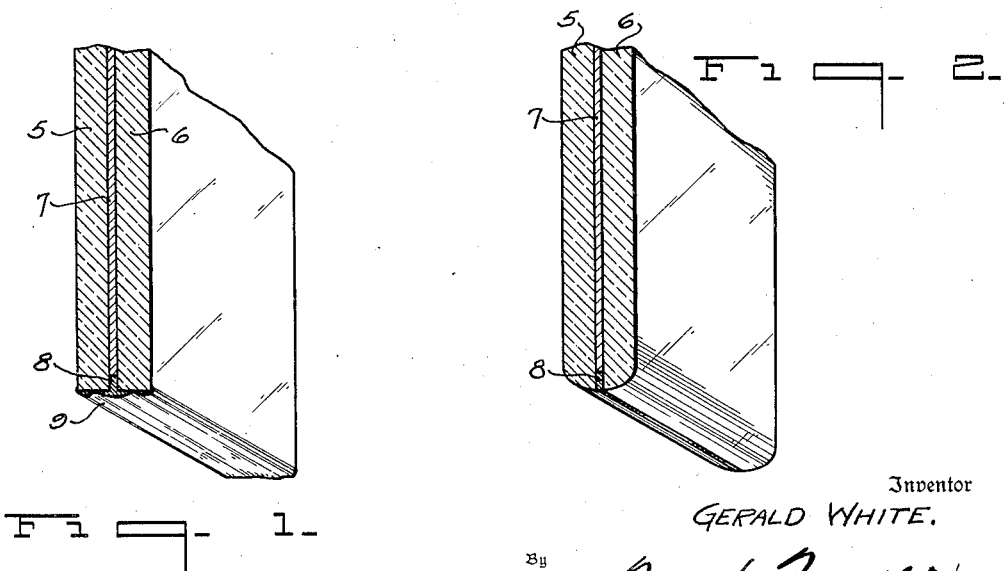
Inventor
GERALD WHITE.
By Frank Fraser
Attorney Patented Nov. 26, 1935

2,022,530

UNITED STATES PATENT OFFICE 2,022,530

TREATMENT OF ABRASIVE TOOLS

Gerald White, Toledo, Ohio, assignor to Libbey-Owens-Ford Glass Company, Toledo, Ohio, a corporation of Ohio Application January 19, 1935, Serial No. 2,456

5 Claims. (Cl. 51—278)

The present invention relates broadly to the art of grinding and polishing glass sheets and has particular reference to an improved method of and composition for treating abrasive tools used in finishing the edges of laminated safety glass.

Laminated safety glass generally comprises two or more sheets of glass and one or more interposed non-brittle membranes bonded together to form a composite structure. With some types of laminated glass, it is customary to seal the edges thereof in order to protect the non-brittle lamination or laminations from the atmosphere. This sealing operation usually consists in first forming a continuous channel around the edges of the laminated sheet by removing the non-brittle material for a short distance in from the edges thereof and in then filling this channel with a suitable sealing material such as pitch or other weather resistant substance. A surplus amount of sealing material is preferably supplied to the channel in order to insure its being completely filled and as a result a certain portion of this material adheres to the edges of the glass sheets.

Subsequent to the sealing operation, the edges of the laminated sheet are preferably finished by being ground to the desired edge contour and then polished. Such finishing is best effected by contact with a moving abrasive tool but considerable difficulty has been experienced with this method due to the fact that the surplus sealing material removed from the edges of the glass sheets during the finishing of said edges tends to adhere to the grinding surface of the tool to such an extent as to seriously interfere with its abrasive action.

This invention therefore contemplates the treatment of the abrasive tool in such a manner as to maintain the grinding surface thereof substantially free from sealing material as well as particles of glass removed from the edges of the laminated sheet during the finishing operation.

In carrying out the invention, a solvent for the sealing material is supplied to the abrasive tool during the grinding of the laminated sheet in order to cut or partially dissolve any sealing material adhering thereto and which may then be floated away from the tool along with the particles of glass as will be more clearly hereinafter described. By maintaining the grinding surface of the abrasive tool substantially free from sealing material and particles of glass, the proper finishing of the edges of the laminated sheet will be greatly facilitated.

Another object of the invention is the provision of an improved composition for treating an abrasive tool used in finishing the edges of sheets of laminated safety glass which will maintain the abrasive tool substantially free from sealing material and particles of glass removed from the edges of the sheet during the finishing operation without clogging the moving parts of the machine or disfiguring the surface of the glass and which, in addition, will improve the grinding action of the tool and act as a cooling medium to prevent overheating and burning of the tool and work.

Other objects and advantages of the invention will become more apparent during the course of the following description when taken in connection with the accompanying drawing.

In the drawing wherein like numerals are employed to designate like parts throughout the same, Fig. 1 is a fragmentary sectional view of a sheet of laminated safety glass after sealing but before the edges thereof have been finished, Fig. 2 is a similar view of the laminated sheet after the edges have been finished, and Fig. 3 is an elevation of one type of edging apparatus which may be used in carrying out the invention.

The type of abrasive tool ordinarily used in finishing the edges of sheets of laminated safety glass is provided with a grinding surface made up of innumerable tiny crystals and the grinding action of the tool is caused by the cutting away of particles of the material being worked on by these crystals. For this reason, it is of great importance in maintaining the efficiency of the tool to keep its grinding surface as free as possible of foreign matter which would tend to clog the pores of the tool and so interfere with the cutting action of the crystals.

With reference to the drawing and particularly to Fig. 1, there is shown a sheet of laminated safety glass including the two sheets of glass 5 and 6 bonded to the opposite faces of an interposed sheet 7 of cellulosic plastic to form a composite structure. The edges of the laminated sheet are sealed as indicated at 8, and this may be accomplished by first removing a portion of the non-brittle material to form a channel or groove and then filling in this channel or groove with the sealing material. As brought out above, during the sealing operation there is a tendency for a certain amount of the sealing material to adhere to the edges of the glass sheets, and this condition is shown in somewhat exaggerated form by the numeral 9. During the subsequent finishing of the edges of the laminated sheets, there is a decided tendency for this surplus sealing material removed therefrom to adhere to the grinding surface of the tool and thus adversely affect the grinding action thereof. It therefore becomes necessary to detach any accumulation of sealing material from the tool as well as to float it and also the particles of ground glass away from the grinding surface. This cannot be accomplished by the use of the usual "wetting" liquids or compounds. The present invention, therefore, proposes the use of an improved composition which is supplied to the grinding surface of the abrasive tool during the finishing operation and which acts to cut or partially dissolve any sealing material adhering thereto as well as causing the floating away of the particles that are cut from the work and so prevent them from filling in between the crystals and causing the grinding surface of the said tool to glaze.

Briefly stated, this is accomplished by supplying to the abrasive tool during the finishing operation a solvent for the sealing material and a diluent for the solvent. For example, a mixture of kerosene and water has been used with very satisfactory results. The kerosene has a solvent or cutting action on the sealing material which accumulates on the tool while the water will act to float both the particles of glass and the sealing material away from the tool. Although kerosene is combustible and if used alone might even be caused to fire by the heat generated during grinding, it is possible to limit the amount of kerosene used in proportion to the amount of water to a point where the mixture will act as an effective cooling agent to prevent overheating and burning of the tool and work without in any way detracting from its value or efficiency in maintaining the tool free of sealing material. Thus, a preferred mixture may consist of one quart of kerosene and ten gallons of water, although variations in these proportions may be resorted to without departing from the invention or seriously affecting the efficiency of the composition.

In addition to the advantages of kerosene when used with water, as outlined above, it has the further advantage of not vaporizing as readily as many other substances having similar properties and thus may be used without too frequent replenishment. It is also comparatively inexpensive and will act as a lubricant for the work and tool and to retard rusting of the metal portions of the apparatus.

This invention is of course not restricted to any particular type of grinding apparatus but may be used with any apparatus including an abrasive tool suitable for finishing the edges of sheets of laminated safety glass. One form of edging apparatus which may be employed in carrying out the invention has been illustrated by way of example in Fig. 3 of the drawing and includes a plurality of grinding units A arranged end to end to form a complete machine through which the sheets of laminated glass 10 to be finished may be continuously passed, the said sheets being supported in a vertical position so that their lower edges will be moved over and in contact with a plurality of rotating grinding tools.

Each unit A includes a framework 11 carrying suitable bearings in which the shaft 12 of the grinding tool 13 is journaled. The grinding tool here shown is in the form of an abrasive wheel having one or a plurality of grooves 14 formed in the periphery thereof, said tool being adapted to rotate within a receptacle 15 also carried by the framework 11. Arranged between the grinding tools of adjacent units A are the horizontal sheet supporting runways 16 which may be of any desired construction and which are positioned to properly present the lower edges of the sheets 10 passing thereover to the grinding tools.

In operation, the receptacles 15 are adapted to be partially filled with a mixture of kerosene and water in proper proportions as indicated at 17 and through which the grinding wheels 13 are caused to rotate at the desired speed. The laminated sheets of glass 10 may be moved through the machine by means of pushers 18 which engage the rear edges of the sheets and are carried by the lower run of a driving chain 19. A weighted roller 20, arranged above each grinding wheel and normally positioned in the path of the upper edges of the moving sheets, is adapted to maintain the bottom edges of the sheets in grinding contact with the grinding wheels during their travel thereover. In Fig. 2 of the drawing is shown a sheet of laminated glass after the edge thereof has been ground and polished. As will be seen, not only has all of the surplus sealing material 9 of Fig. 1 been removed but, in addition, the edges of the glass sheets 5 and 6 have been ground to form a so-called pencil edge.

As described, the preferred method of supplying the kerosene and water to the abrasive tool is to mix the kerosene with the water and to then use the composition thus formed as a bath, through which the tool may be moved during grinding. However, the solvent and diluent may be applied, either together or separately, in a number of other ways such as by dripping onto the moving tool.

This invention is now being extensively used commercially by the assignee company and has proved very satisfactory in maintaining the grinding surfaces of the abrasive tools practically free of any accumulation of sealing material and particles of glass during the finishing operation. Although particularly described in connection with sealed laminated safety glass and the removal of sealing material from the abrasive tool, the invention is of course not restricted to such use.

It is to be understood that the form of the invention herewith shown and described is to be taken as the preferred embodiment of the same, and that various changes in the shape, size and arrangement of parts may be resorted to without departing from the spirit of the invention or the scope of the subjoined caims.

I claim:

1. The method of treating an abrasive tool used in finishing the edges of a sheet of laminated safety glass which have been previously sealed, consisting in supplying to the abrasive tool during the finishing operation a solvent for the sealing material and a diluent for the solvent.

2. The method of treating an abrasive tool used in finishing the edges of a sheet of laminated safety glass which have been previously sealed, consisting in supplying a mixture of kerosene and water to the abrasive tool during the finishing operation.

3. The method of finishing the edges of a sheet of sealed laminated safety glass, which consists in bringing the edge of the sheet to be finished into grinding contact with a moving abrasive tool, and in simultaneously removing any accumulation of sealing material from the abrasive tool by supplying to said tool a solvent for the sealing material and a diluent for the solvent.

4. The method of finishing the edges of a sheet of sealed laminated safety glass, which consists in bringing the edge of the sheet to be finished into grinding contact with a moving abrasive tool, and in simultaneously removing any accumulation of sealing material from the abrasive tool by supplying to said tool a mixture of kerosene and water.

5. The method of finishing the edges of a sheet of sealed laminated safety glass, which consists in bringing the edge of the sheet to be finished into grinding contact with a moving abrasive tool, and in simultaneously removing any accumulation of sealing material from said tool by causing the grinding surface thereof to move through a bath of kerosene and water during the finishing operation.

GERALD WHITE.